United States Patent
Darby, Jr. et al.

(10) Patent No.: US 8,144,000 B2
(45) Date of Patent: Mar. 27, 2012

(54) COLLISION AVOIDANCE

(75) Inventors: George Derrick Darby, Jr., Dunwoody, GA (US); Juan Carlos Santamaria, Suwanee, GA (US); Augusto Opdenbosch, Alpharetta, GA (US)

(73) Assignee: Trimble Navigation Limited, Sunnyvale, CA (US)

( * ) Notice: Subject to any disclaimer, the term of this patent is extended or adjusted under 35 U.S.C. 154(b) by 990 days.

(21) Appl. No.: 11/904,353

(22) Filed: Sep. 26, 2007

(65) Prior Publication Data

US 2009/0083100 A1   Mar. 26, 2009

(51) Int. Cl.
 *B60Q 1/00* (2006.01)
(52) U.S. Cl. .......... 340/435; 340/436; 340/685; 701/301
(58) Field of Classification Search .................. 340/435, 340/436, 679, 685, 686.1, 686.6, 572.1; 701/119, 701/96, 301, 117
 See application file for complete search history.

(56) References Cited

U.S. PATENT DOCUMENTS

| | | |
|---|---|---|
| 3,796,322 A | 3/1974 | Cording |
| 4,178,591 A | 12/1979 | Geppert |
| 4,752,012 A | 6/1988 | Juergens |
| 4,857,753 A | 8/1989 | Mewburn-Crook et al. |
| 5,095,531 A | 3/1992 | Ito |
| 5,224,388 A | 7/1993 | Pratt |
| 5,359,542 A | 10/1994 | Pahmeier et al. |
| 5,491,486 A | 2/1996 | Welles, II |
| 5,586,030 A | 12/1996 | Kemner et al. |
| 5,634,565 A | 6/1997 | Kesage |
| 5,640,452 A | 6/1997 | Murphy |
| 5,646,844 A | 7/1997 | Gudat et al. |
| 5,650,770 A | 7/1997 | Schlager et al. |
| 5,752,197 A | 5/1998 | Ratioula |
| 5,859,839 A | 1/1999 | Ahlenius et al. |
| 5,883,817 A | 3/1999 | Chisholm et al. |
| 5,890,091 A | 3/1999 | Talbot et al. |
| 5,917,405 A | 6/1999 | Joao |
| 5,931,875 A | 8/1999 | Kemner et al. |
| 5,987,379 A | 11/1999 | Smith |
| 6,016,117 A | 1/2000 | Nelson, Jr. |
| 6,046,687 A | 4/2000 | Janky |
| 6,064,335 A | 5/2000 | Eschenbach |
| 6,067,031 A | 5/2000 | Janky et al. |
| 6,118,196 A | 9/2000 | Cheng-Yon |
| 6,124,825 A | 9/2000 | Eschenbach |

(Continued)

FOREIGN PATENT DOCUMENTS

GB   2373086   9/2002

(Continued)

OTHER PUBLICATIONS

"Highland Man'S Invention Success With Dewalt", http://www.heraldextra.com/content/view/195674/4/, (Oct. 8, 2006),3.

(Continued)

*Primary Examiner* — Toan N Pham

(57) ABSTRACT

In a method for avoiding a collision on a job site, information is received regarding a plurality of selected entities on the job site. The information is received at a location independent from the entities. The information is evaluated to determine whether a trigger has occurred. The trigger is associated with a potential collision situation involving an entity of the entities. A collision alert message is issued for the entity if the trigger has occurred.

68 Claims, 7 Drawing Sheets

U.S. PATENT DOCUMENTS

| | | | |
|---|---|---|---|
| 6,144,307 A | 11/2000 | Elliot | |
| 6,166,688 A | 12/2000 | Cromer et al. | |
| 6,216,071 B1 | 4/2001 | Motz | |
| 6,243,648 B1 | 6/2001 | Kilfeather et al. | |
| 6,246,932 B1 | 6/2001 | Kageyama et al. | |
| 6,268,804 B1 | 7/2001 | Janky et al. | |
| 6,297,744 B1 * | 10/2001 | Baillargeon et al. | 340/679 |
| 6,301,616 B1 | 10/2001 | Pal et al. | |
| 6,317,500 B1 | 11/2001 | Murphy | |
| 6,320,273 B1 | 11/2001 | Nemec | |
| 6,330,149 B1 | 12/2001 | Burrell | |
| 6,356,196 B1 | 3/2002 | Wong et al. | |
| 6,362,736 B1 | 3/2002 | Gehlot | |
| 6,377,165 B1 | 4/2002 | Yoshioka et al. | |
| 6,439,515 B1 | 8/2002 | Powers | |
| 6,453,237 B1 | 9/2002 | Fuchs et al. | |
| 6,459,988 B1 | 10/2002 | Fan et al. | |
| 6,480,788 B2 | 11/2002 | Kilfeather et al. | |
| 6,484,078 B1 | 11/2002 | Kageyama | |
| 6,496,766 B1 | 12/2002 | Bernold et al. | |
| 6,501,421 B1 | 12/2002 | Dutta | |
| 6,505,049 B1 | 1/2003 | Dorenbosch | |
| 6,512,465 B2 | 1/2003 | Flick | |
| 6,539,307 B1 | 3/2003 | Holden et al. | |
| 6,560,536 B1 | 5/2003 | Sullivan et al. | |
| 6,609,064 B1 | 8/2003 | Dean | |
| 6,650,242 B2 * | 11/2003 | Clerk et al. | 340/573.1 |
| 6,651,000 B2 | 11/2003 | van Diggelen et al. | |
| 6,657,587 B1 | 12/2003 | Mohan | |
| 6,658,336 B2 | 12/2003 | Browne et al. | |
| 6,658,349 B2 | 12/2003 | Cline | |
| 6,668,157 B1 | 12/2003 | Takeda et al. | |
| 6,675,095 B1 | 1/2004 | Bird et al. | |
| 6,677,938 B1 | 1/2004 | Maynard | |
| 6,700,762 B2 | 3/2004 | Underwood et al. | |
| 6,725,158 B1 | 4/2004 | Sullivan et al. | |
| 6,801,853 B2 | 10/2004 | Workman | |
| 6,804,602 B2 | 10/2004 | Impson et al. | |
| 6,826,452 B1 | 11/2004 | Holland et al. | |
| 6,829,535 B2 | 12/2004 | van Diggelen et al. | |
| 6,843,383 B2 | 1/2005 | Schneider et al. | |
| 6,864,789 B2 | 3/2005 | Wolfe | |
| 6,865,169 B1 | 3/2005 | Quayle et al. | |
| 6,934,629 B1 | 8/2005 | Chisholm et al. | |
| 6,970,801 B2 | 11/2005 | Mann | |
| 6,981,423 B1 | 1/2006 | Discenzo | |
| 7,020,555 B1 | 3/2006 | Janky et al. | |
| 7,031,883 B1 | 4/2006 | Lee | |
| 7,032,763 B1 | 4/2006 | Zakula, Sr. et al. | |
| 7,034,683 B2 | 4/2006 | Ghazarian | |
| 7,050,907 B1 | 5/2006 | Janky et al. | |
| 7,070,060 B1 | 7/2006 | Feider et al. | |
| 7,095,368 B1 | 8/2006 | van Diggelen | |
| 7,095,370 B1 | 8/2006 | van Diggelen et al. | |
| 7,158,883 B2 | 1/2007 | Fuchs et al. | |
| 7,212,120 B2 * | 5/2007 | Gudat | 340/572.1 |
| 7,289,875 B2 | 10/2007 | Recktenwald et al. | |
| 7,295,855 B1 | 11/2007 | Larsson et al. | |
| 7,298,319 B2 | 11/2007 | Han et al. | |
| 7,308,114 B2 | 12/2007 | Takehara et al. | |
| 7,313,476 B2 | 12/2007 | Nichols et al. | |
| 7,324,921 B2 | 1/2008 | Sugahara et al. | |
| 7,344,037 B2 | 3/2008 | Zakula et al. | |
| 7,367,464 B1 | 5/2008 | Agostini et al. | |
| 7,395,151 B2 | 7/2008 | O'Neill et al. | |
| 7,398,153 B2 | 7/2008 | Workman et al. | |
| 7,493,112 B2 | 2/2009 | Adachi et al. | |
| 7,548,200 B2 | 6/2009 | Garin et al. | |
| 7,548,816 B2 | 6/2009 | Riben et al. | |
| 7,639,181 B2 | 12/2009 | Wang et al. | |
| 7,667,642 B1 | 2/2010 | Frericks et al. | |
| 7,710,317 B2 | 5/2010 | Cheng et al. | |
| 7,719,416 B2 | 5/2010 | Arms et al. | |
| 7,756,615 B2 | 7/2010 | Barfoot et al. | |
| 2002/0070856 A1 | 6/2002 | Wolfe | |
| 2002/0082036 A1 | 6/2002 | Ida et al. | |
| 2002/0117609 A1 | 8/2002 | Thibault et al. | |
| 2002/0142788 A1 | 10/2002 | Chawla et al. | |
| 2002/0196151 A1 | 12/2002 | Troxler | |
| 2003/0045314 A1 | 3/2003 | Burgan et al. | |
| 2003/0064744 A1 | 4/2003 | Zhang et al. | |
| 2003/0073435 A1 | 4/2003 | Thompson et al. | |
| 2003/0119445 A1 | 6/2003 | Bromham et al. | |
| 2004/0024522 A1 | 2/2004 | Walker et al. | |
| 2004/0034470 A1 | 2/2004 | Workman | |
| 2004/0044911 A1 | 3/2004 | Takada et al. | |
| 2004/0145496 A1 | 7/2004 | Ellie | |
| 2004/0148083 A1 | 7/2004 | Arakawa et al. | |
| 2004/0196182 A1 | 10/2004 | Unnold | |
| 2004/0219927 A1 | 11/2004 | Sumner | |
| 2004/0243285 A1 | 12/2004 | Gounder | |
| 2005/0030175 A1 | 2/2005 | Wolfe | |
| 2005/0055161 A1 | 3/2005 | Kalis et al. | |
| 2005/0095985 A1 | 5/2005 | Hafeoz | |
| 2005/0103738 A1 | 5/2005 | Recktenwald et al. | |
| 2005/0116105 A1 | 6/2005 | Munk et al. | |
| 2005/0137742 A1 | 6/2005 | Goodman et al. | |
| 2005/0147062 A1 | 7/2005 | Khouaja et al. | |
| 2005/0154904 A1 | 7/2005 | Perepa et al. | |
| 2005/0179541 A1 | 8/2005 | Wolfe | |
| 2005/0242052 A1 | 11/2005 | O'Connor et al. | |
| 2006/0027677 A1 | 2/2006 | Abts | |
| 2006/0243056 A1 | 11/2006 | Sundermeyer et al. | |
| 2007/0005244 A1 | 1/2007 | Nadkarni | |
| 2007/0027583 A1 | 2/2007 | Tamir et al. | |
| 2007/0159354 A1 | 7/2007 | Rosenberg | |
| 2007/0202861 A1 | 8/2007 | Adachi et al. | |
| 2007/0255498 A1 | 11/2007 | McDaniel et al. | |
| 2008/0014965 A1 | 1/2008 | Dennison et al. | |
| 2008/0036617 A1 | 2/2008 | Arms et al. | |
| 2008/0084332 A1 | 4/2008 | Ritter et al. | |
| 2008/0100977 A1 | 5/2008 | Shreiner et al. | |
| 2008/0122234 A1 | 5/2008 | Alioto et al. | |
| 2009/0009389 A1 | 1/2009 | Mattos | |
| 2009/0109049 A1 * | 4/2009 | Frederick et al. | 340/686.6 |
| 2010/0100338 A1 | 4/2010 | Vik et al. | |
| 2010/0332266 A1 | 12/2010 | Tamir et al. | |

FOREIGN PATENT DOCUMENTS

| | | |
|---|---|---|
| JP | 05286692 | 11/1993 |
| JP | 8240653 | 9/1996 |
| JP | 2000/048283 | 2/2000 |
| JP | 2000/249752 | 9/2000 |
| JP | 2002/197593 | 7/2002 |
| JP | 2002/197595 | 7/2002 |
| JP | 2002/217811 | 8/2002 |
| WO | WO-00/68907 | 11/2000 |
| WO | WO-02/35492 | 5/2002 |
| WO | WO-03/007261 | 1/2003 |
| WO | WO-2004/017272 | 2/2004 |
| WO | WO-2004/083888 | 9/2004 |
| WO | WO-2005/017846 | 2/2005 |
| WO | WO-2009/084820 | 7/2009 |

OTHER PUBLICATIONS

"Tower Cranes Anti-Collision and Zone Protection System", www.tac3000.com, (2004),36.

"Anti-Collision Systems A Clash of Cultures", http://www.cranestodaymagazine.com/story.asp?sectionCode=66&storyCode=2043070, (Mar. 21, 2007),6.

Abderrahim, M. et al., "A Mechatronics Security System for the Construction Site", www.elsevier.com/locate/autcon, (Sep. 7, 2004),460-466.

* cited by examiner

700

---

RECEIVING INFORMATION REGARDING A PLURALITY OF SELECTED ENTITIES ON A JOB SITE, THE INFORMATION RECEIVED AT A LOCATION INDEPENDENT FROM THE ENTITIES.
710

↓

EVALUATING THE INFORMATION TO DETERMINE WHETHER A TRIGGER HAS OCCURRED, THE TRIGGER ASSOCIATED WITH A POTENTIAL COLLISION SITUATION INVOLVING AN ENTITY OF THE ENTITIES.
720

↓

ISSUING A COLLISION ALERT MESSAGE TO THE ENTITY IF THE TRIGGER HAS OCCURRED.
730

FIG. 7

COLLISION AVOIDANCE

BACKGROUND

Presently, on a job site, such as a construction site, workers and management utilize physical barriers and/or mark regions and entities of the job site which should site which should be avoided or not entered. For example, to protect an endangered ancient tree a worker may mark a protected region by placing flags around the tree or else by placing stakes around the tree and stringing ropes or plastic tape between the stakes. These markings are intended to prevent a worker from entering the region. Obviously, some flags, stakes, rope, and/or plastic are not sufficient to stop a dozer or an earthmover from entering such a protected region and potentially damaging. Additionally, if a worker is unaware of or cannot see the markings, this mechanism of collision avoidance is not effective. Thus, the effectiveness of protecting regions or entities in this manner is very dependent upon workers maintaining situational awareness, especially when operating vehicles or construction equipment assets.

Likewise, avoidance of a collision between one physical job site entity, such as a vehicle, and another physical job site entity, such as a second vehicle is also heavily dependent upon situational awareness of one or more workers. Presently, some collision avoidance measures such as proximity alarms do exist. Such proximity alarms typically transmit a signal which can be sensed by similar alarms. Then, when one proximity alarm is in reception range of a second proximity alarm, some sort of a warning is enunciated or emitted. Such proximity alarms are helpful, but their use and applications are limited. This is due in part to the inherent imprecision associated with proximity sensing (e.g., transmission and reception ranges may vary greatly from one proximity alarm to another). This is also due in part to the fact that such alarms are not operable to react in a flexible manner based upon a variety of situational factors, such as speed of an entity, location on a job site, type of entity or entities involved, conditions at the job site, and/or three-dimensional location of an entity relative to another entity.

As can be seen, presently existing forms of job site collision avoidance have drawbacks which limit their flexibility and effectiveness.

SUMMARY

In a method for avoiding a collision on a job site, information is received regarding a plurality of selected entities on the job site. The information is received at a location independent from the entities. The information is evaluated to determine whether a trigger has occurred. The trigger is associated with a potential collision situation involving an entity of the entities. A collision alert message is issued for the entity if the trigger has occurred.

BRIEF DESCRIPTION OF THE DRAWINGS

The accompanying drawings, which are incorporated in and form a part of this application, illustrate embodiments of the present technology for collision avoidance, and together with the description, serve to explain the principles of the present technology. Unless noted, the drawings referred to this description should be understood as not being drawn to scale.

FIG. 7 is a flow diagram of an example method for avoiding a collision on a job site, in accordance with one embodiment.

DETAILED DESCRIPTION

Figure 1:
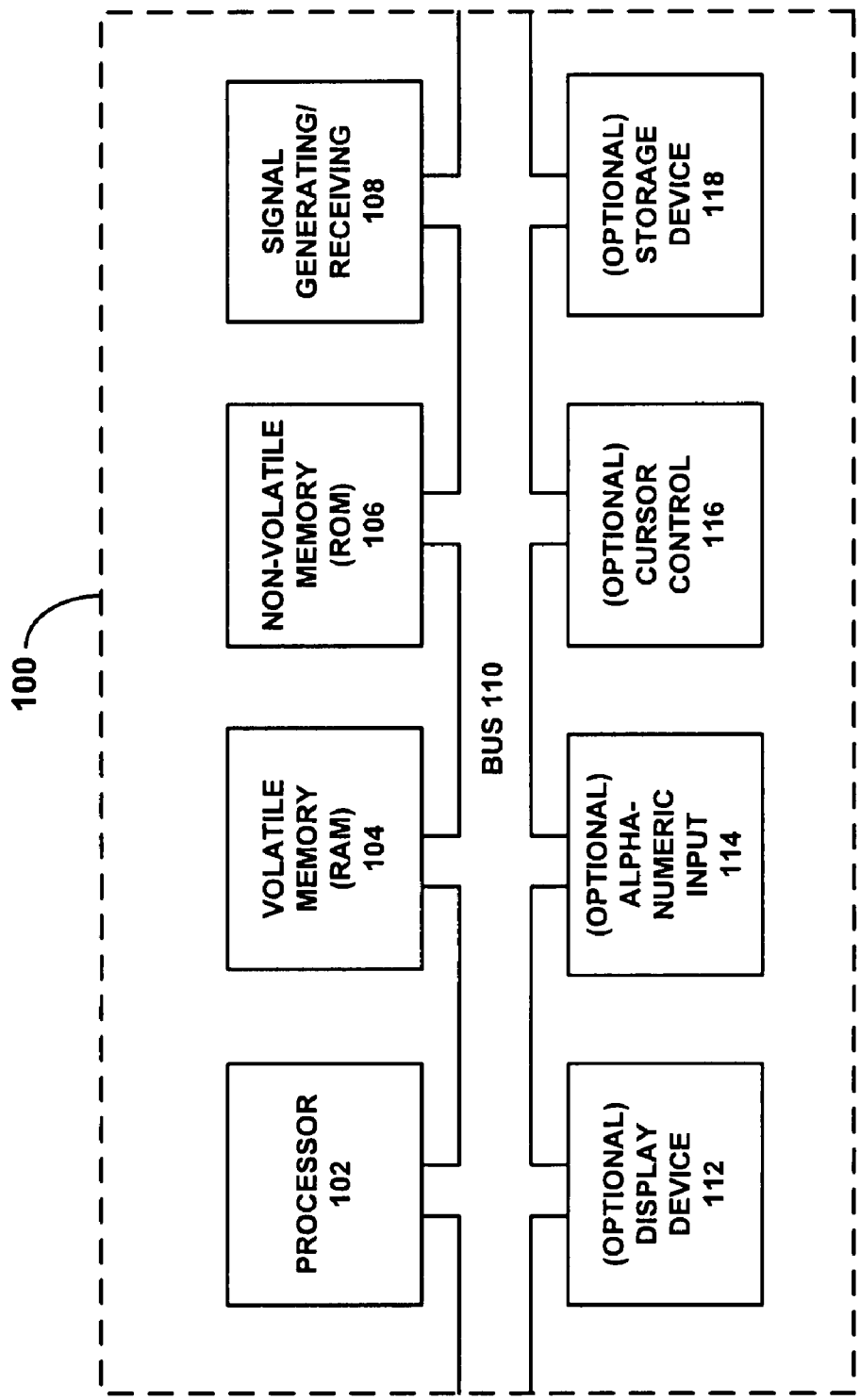
FIG. 1 is a block diagram of an example computer system used in accordance with an embodiment.

Reference will now be made in detail to various embodiments of the present technology, examples of which are illustrated in the accompanying drawings. While the present technology will be described in conjunction with these embodiments, it will be understood that they are not intended to limit the present technology to these embodiments. On the contrary, the present technology is intended to cover alternatives, modifications and equivalents, which may be included within the spirit and scope as defined by the appended claims. Furthermore, in the following description, numerous specific details are set forth in order to provide a thorough understanding of the present technology. In other instances, well-known methods, procedures, objects, and circuits have not been described in detail as not to unnecessarily obscure aspects of the present technology.

Notation and Nomenclature

Unless specifically stated otherwise as apparent from the following discussions, it is appreciated that throughout the present detailed description, discussions utilizing terms such as "receiving", "evaluating", "issuing", "setting", "continuing", "comparing", "transmitting", "providing", "facilitating", "outputting", "allowing", "implementing", "establishing", or the like, refer to the actions and processes of a computer system (such as computer system 100 of FIG. 1), or similar electronic computing device. Computer system 100 or similar electronic computing device manipulates and transforms data represented as physical (electronic) quantities within the computer system's registers and memories into other data similarly represented as physical quantities within the computer system memories or registers or other such information storage, transmission, or display devices.

The present technology may be described in the general context of computer-executable instructions, such as program modules, being executed or executable by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

Overview of Discussion

Discussion will begin with a description of an example computer system environment with which, or upon which, embodiments of the present technology may operate. Discussion will proceed to a description of an example of a collision avoidance system. A general description of the operation of the components of this collision avoidance system will be provided. A collision avoidance device, which can be used in conjunction with the collision avoidance system, will then be described. Operation of collision avoidance system and the collision avoidance device will then be described in more detail in conjunction with a description of an example method for avoiding a collision on a job site.

As described herein, entities may be physical entities or virtual entities which are located on or proximate to a job site. Some examples of physical entities are buildings, structures, building materials, cranes, crane booms, vehicles, construction equipment assets, and people. For purposes of this specification a construction equipment asset is defined as a piece of construction machinery, which is typically mobile. Some examples of construction equipment assets include, but are not limited to: a dozer, a loader, a heavy truck (e.g., a dump truck), a grader, a scraper, a tractor, a backhoe, and the like.

An example of a virtual entity is a virtually marked geo-fence which is associated with two-dimensional or three-dimensional locations on or proximate to a job site. For example, such a geo-fence may exist as a virtual barrier marked around a protected physical object or region, such as an ancient tree, a saguaro cactus, or an endangered butterfly habitat. Likewise such a geo-fence may exist as a virtual barrier marked around a dangerous region such as a high voltage line or a job site location with unstable or contaminated soil. Such a geo-fence may also be used in combination with a physical barrier (e.g., ropes and flags). Another example of a virtual entity is a zone or volume which is associated with a physical entity, such a crane boom. Such an associated virtual entity will typically move in conjunction with movement of the physical entity with which it is associated.

As described herein, a job site is typically a location such as a construction site, warehouse, freight terminal, open pit mine, waste disposal area, factory, utility plant, and/or another distinct location where workers operate entities such as construction equipment assets, vehicles, mining equipment, and/or cranes.

Example Computer System Environment

With reference now to FIG. 1, a block diagram is shown of an embodiment of an example computer system 100 which may be used in accordance with various embodiments described herein. It should be appreciated that computing system 100 is not strictly limited to being a computer system. As such, computer system 100 of the present embodiment may be well suited to be any type of computing device (e.g., real time server computer, web server, portable computing device, desktop computer, mobile phone, pager, personal digital assistant, collision avoidance device, collision avoidance system, and etc.). Within the discussions herein, certain processes and steps are discussed that are realized, in one embodiment, as a series of instructions (e.g., software program) that reside within computer readable memory units and are executed by a processor(s) of computing system 100. When executed, the instructions cause computer system 100 to perform specific actions and exhibit specific behavior that may be described in detail herein.

Computer system 100 of FIG. 1 comprises an address/data bus 110 for communicating information, one or more central processors 102 coupled with bus 110 for processing information and instructions. Central processor unit(s) 102 may be a microprocessor or any other type of processor. Computer system 100 also includes data storage features such as a computer usable volatile memory unit 104 (e.g., random access memory, static RAM, dynamic RAM, etc.) coupled with bus 110 for storing information and instructions for central processor(s) 102, a computer usable non-volatile memory unit 106 (e.g., read only memory, programmable ROM, flash memory, EPROM, EEPROM, etc.) coupled with bus 110 for storing static information and instructions for processor(s) 102. Computer system 100 also includes one or more signal generating and receiving devices 108 coupled with bus 110 for enabling computer system 100 to interface with other electronic devices and computer systems. The communication interface(s) 108 of the present embodiment may include wired and/or wireless communication technology.

Optionally, computer system 100 may include an alphanumeric input device 114 including alphanumeric and function keys coupled to the bus 110 for communicating information and command selections to the central processor(s) 102. Computer system 100 can include an optional cursor control or cursor directing device 116 coupled to the bus 110 for communicating user input information and command selections to the central processor(s) 102. The cursor-directing device 116 may be implemented using a number of well-known devices such as a mouse, a track-ball, a track-pad, an optical tracking device, and a touch screen, among others. Alternatively, it is appreciated that a cursor may be directed and/or activated via input from the alphanumeric input device 114 using special keys and key sequence commands. The present embodiment is also well suited to directing a cursor by other means such as, for example, voice commands.

Computing system 100 of FIG. 1 may also include one or more optional computer usable data storage devices 118 such as a magnetic or optical disk and disk drive (e.g., hard drive, floppy diskette, Compact Disk-Read Only Memory (CD-ROM), Digital Versatile Disk (DVD)) coupled with bus 110 for storing information and/or computer executable instructions. An optional display device 112 may be coupled to bus 110 of computing system 100 for displaying video and/or graphics. It should be appreciated that optional display device 112 may be a cathode ray tube (CRT), flat panel liquid crystal display (LCD), field emission display (FED), plasma display or any other display device suitable for displaying video and/or graphic images and alphanumeric characters recognizable to a user.

Example Collision Avoidance System

Figure 2:
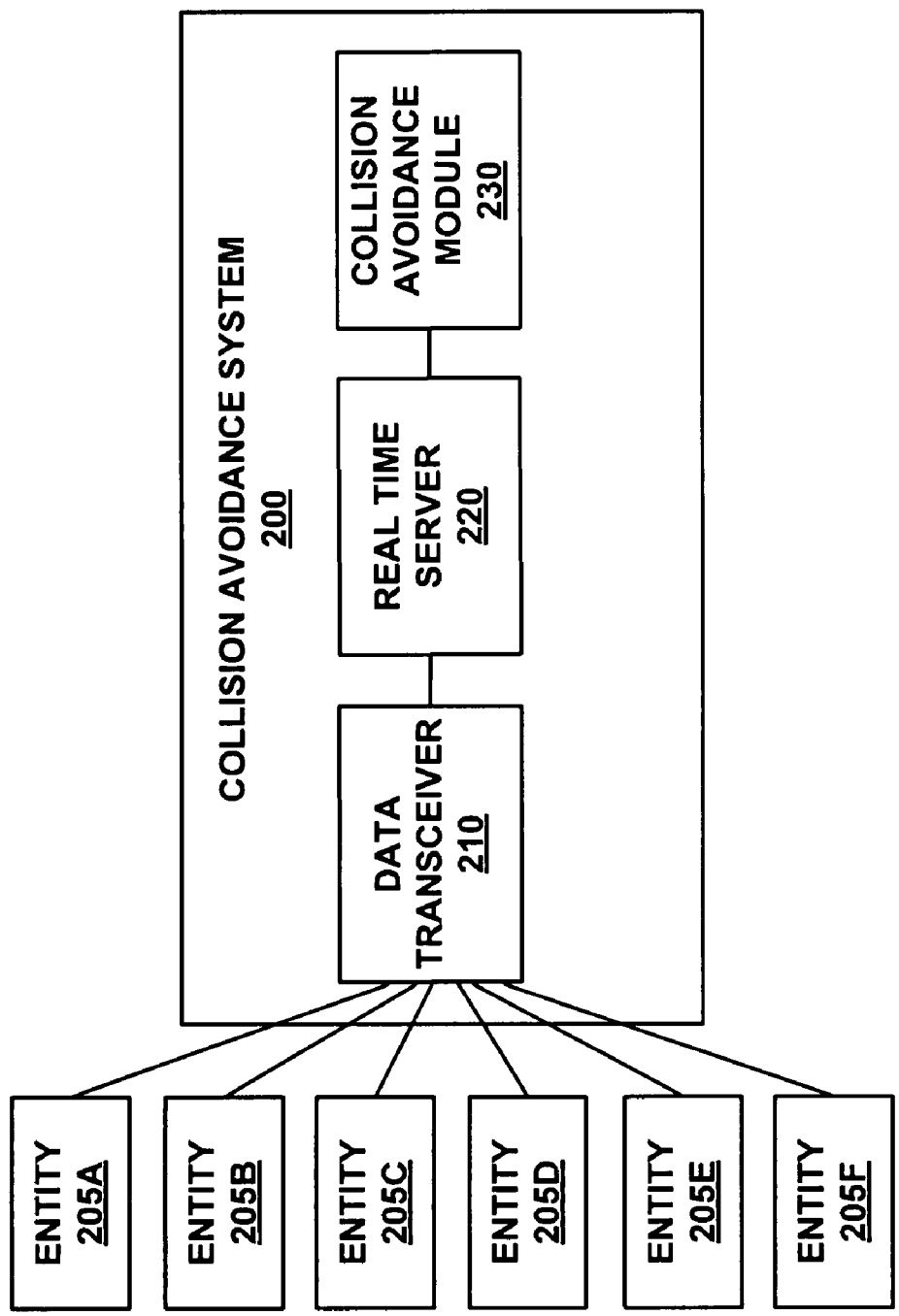
FIG. 2 is a block diagram of an example collision avoidance system, in accordance with one embodiment.

Referring now to FIG. 2, a block diagram is shown of an example collision avoidance system 200. As will be further described herein, system 200 may be utilized to help avoid collisions between entities on a job site.

As shown in FIG. 2, collision avoidance system 200 is comprised of a data transceiver 210, a real time server 220, and a collision avoidance module 230. It is appreciated that while the components of system 200 are coupled together they are not required to be physically close to one another. For example, in one embodiment, data transceiver 210 is located on or proximate to a job site, while real time server 220 and collision avoidance module 230 are located in a different town, state or country from data transceiver 210. In one such example, data transceiver 210 is coupled with real time server via transmission control protocol/internet protocol, while real time server 220 and collision avoidance module 230 are coupled together as part of a local area network.

Data transceiver 210 is configured for wirelessly receiving information regarding a plurality of entities on a job site. Data transceiver 210 operates wirelessly to receive information in one or more well known fashions, such as via Bluetooth, via WiMax, via cellular telephone or radio, via one of the Institute of Electrical and Electronics Engineers 802.1 family of standards, or via other wireless data communication standard or protocol. Likewise, data transceiver 210 is also operable to wirelessly transmit information, such as a collision alert message received from collision avoidance module 230 via real time server 220. Such a transmitted collision alert message can be transmitted to a single entity (e.g., entity 205A) or to a plurality of entities (e.g., entities 205A, 205B, and 205C). In one embodiment, data transceiver 210 is located on or proximate to a particular job site. In another embodiment, data transceiver 210 is located independent from a job site and employs a wireless communication technology (e.g., cellular telephone or radio) to carryout communications with entities on, proximate to, or assigned to a particular job site. In some embodiments, information transceiver 210 converts information received from data transceiver 210 into triplet information format. Such conversion is further described below.

With continued reference to FIG. 2, real time server 220 is shown coupled with data transceiver 210. Real time server 220 is configured for providing the received information in real time to a subscribed module, such as collision avoidance module 230, and in some embodiments to a plurality of subscribed modules. Real time server 220 serves out received information in a real time fashion (nearly immediately) to subscribed modules after the data is received. This allows subscribed modules to make "decisions" and/or take actions based upon the served information in real time (nearly contemporaneously with the occurrence and reporting of the information). This also allows a subscribed module to issue instructions and/or messages based upon the information in real time (nearly contemporaneously with the occurrence and reporting of the information). In some embodiments, where a conversion has not yet been accomplished, real time server 220 converts information received from data transceiver 210 into triplet information format. In one embodiment, real time server 220 is also operable to transfer information, such as a collision alert message from collision avoidance module 230 to data transceiver 210.

Collision avoidance module 230 is coupled with real time server 220 and configured to receive selected portions of the information which has been reported to real time server 220 via data transceiver 210. In some embodiments, this means that collision avoidance module 230 is subscribed to receive selected information (such as location and or operation information) from one or more selected entities. Collision avoidance module 230 is configured for evaluating selected portions of the information for occurrence of a trigger associated with a potential collision situation involving an entity (e.g., 205A) of the plurality of entities (e.g., 205A, 205B, 205C, 205D, 205E, 205F) which data transceiver 210 receives information regarding.

Collision avoidance module 230 is typically located independently from the plurality of entities (e.g., 205A, 205B, 205C, 205D, 205E, 205F) which it receives information regarding. This means that in one embodiment collision avoidance module 230 is not part of or physically connected/attached to an entity which it tracks collisions for or to a collision avoidance device 600 that is coupled with such an entity (e.g., entity 205A). In one instance, collision avoidance module 230 may be located at the same job site as one or more of the entities about which it receives information. However, as previously described, in other instances, collision avoidance module 230 functions equally well when located a great distance away from the entities about which it receives information. Thus collision avoidance module 230 may be located in a different town, state, or country than one or more entity (e.g., 205A) which it receives information regarding and/or from the one or more collision avoidance devices 600 from which it receives information.

Figure 3:
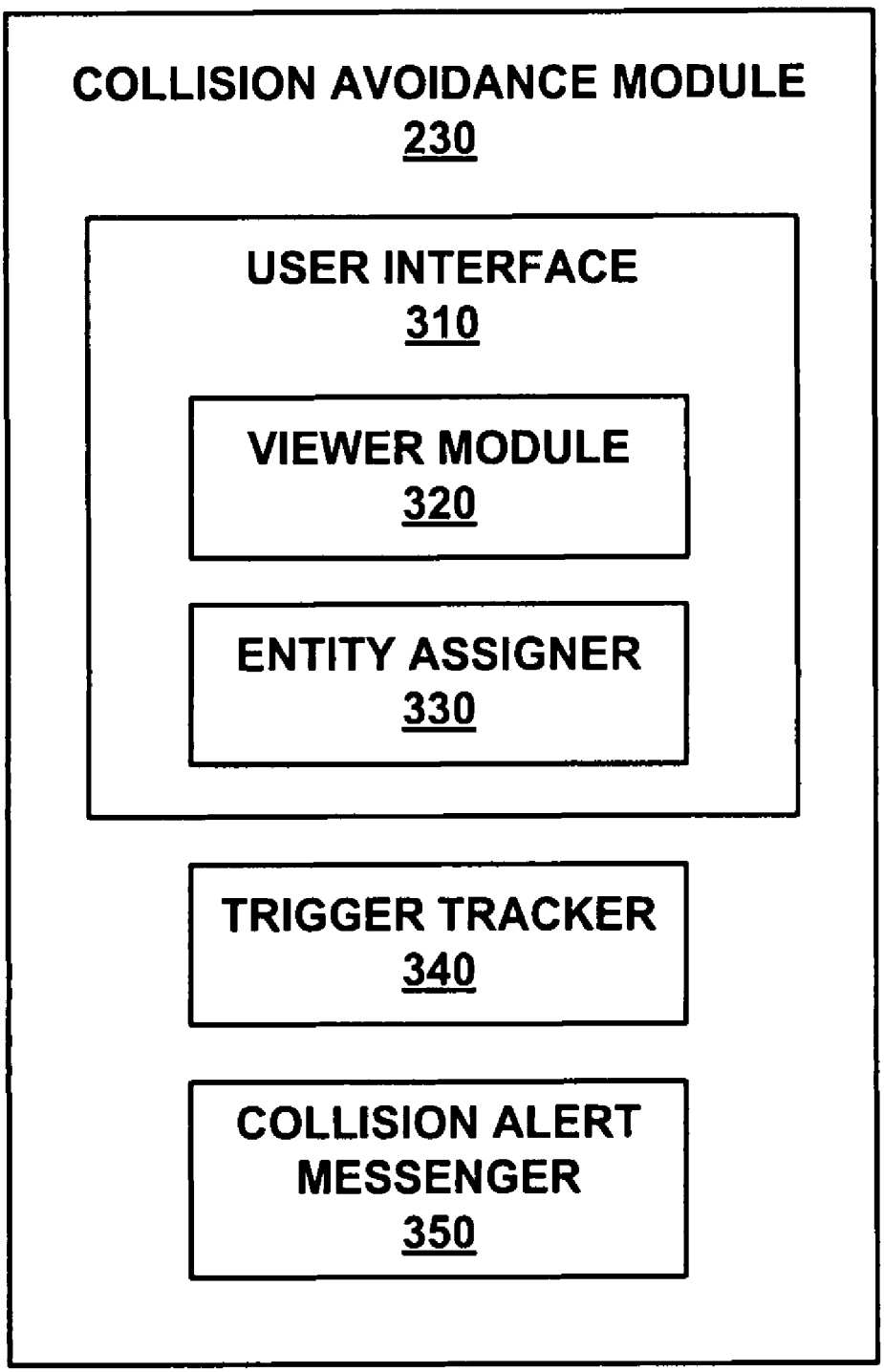
FIG. 3 is a block diagram of an example collision avoidance module utilized in a collision avoidance system, in accordance with one embodiment.

With reference now to FIG. 3, a block diagram is shown of an example collision avoidance module 230, which may be utilized in collision avoidance system 200, in accordance with one embodiment. As shown in FIG. 3, in one embodiment, collision avoidance module 230 comprises a plurality of sub-modules including a user interface 310, a trigger tracker 340, and a collision alert messenger 350. As shown in FIG. 3, in one embodiment, user interface 310 further comprises sub-modules including a viewer module 320, and an entity assigner 330. It is appreciated that any of the modules and/or sub-modules of collision avoidance module 230 are capable of interacting with any or all of the other modules and/or sub-modules of collision avoidance module 230.

With continued reference to FIG. 3, user interface 310 is configured for facilitating user interaction with and modification of settings of collision avoidance module 230.

For example, in one embodiment, through functionality offered by viewer module 320, a user is able to view a real time visualization (e.g., a model/simulation) of a work site and the entities thereon or proximate thereto which are being tracked for purposes of collision avoidance.

More specifically, viewer module 320 is configured for outputting in real time a viewable rendering of the one or more entities for which collision avoidance module 230 receives information. In one embodiment, viewer module 320 outputs a viewable rendering which is formatted as either a two-dimensional or three-dimensional rendering of these entities with respect to the job site that the entity/entities are on or proximate to. Such a viewable rendering may also comprise other physical and/or virtual entities that are mapped, modeled, or located on or proximate to the job site. In one embodiment, viewer module 320 outputs the viewable rendering for viewing on a display device, such as, for example, display device 112.

Figure 4:
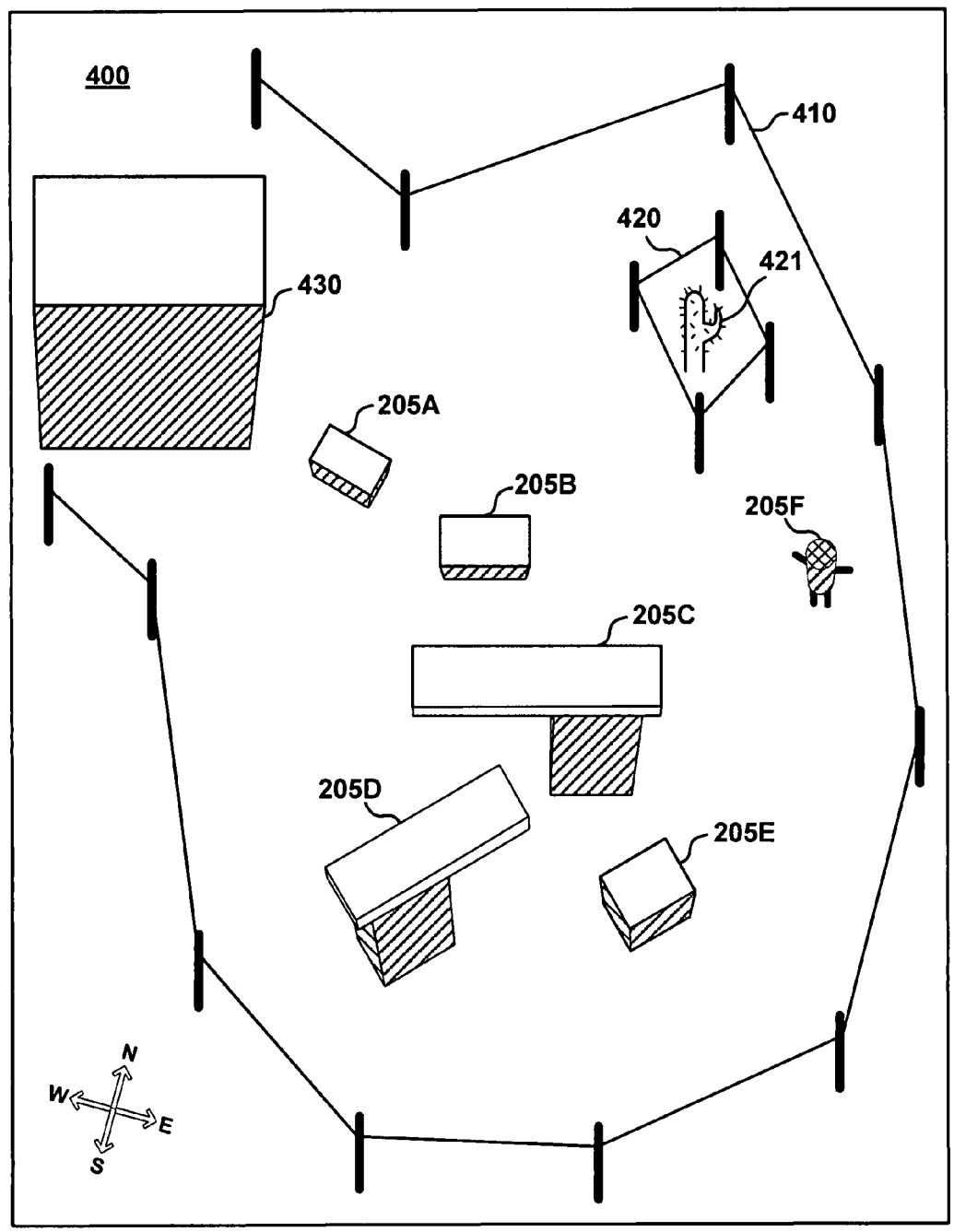
FIG. 4 is an example of a displayed visual rendering of entities on a job site, in accordance with one embodiment.

FIG. 4 shows an example of a displayed visual rendering 400 of entities on a job site, in accordance with one embodiment. For purposes of illustration of this concept, entities in FIG. 4 are shown at a low level of detail. It is appreciated that in other embodiments, the entities of FIG. 4 may be shown at other levels of detail. In FIG. 4, displayed entity 205A represents the position of a vehicle within a job site bounded by geo-fence 410. Displayed entity 420 represents a geo-fence that has been established surrounding protected saguaro cactus 421 (which may not be displayed in some visual representations). Displayed entity 430 represents a structure that is present on the job site. Displayed entity 205B represents a construction foreman's truck. Displayed entity 205C represents a crane boom of a tower crane. Displayed entity 205D represents a crane boom of a second tower crane. Displayed entity 205E represents an earthmover (a construction equipment asset). Finally, displayed entity 205F represents a person, in this case a worker at the job site. In FIG. 4, each displayed entity is displayed either at its modeled location, or at the location represented by the most recent location information received regarding the entity.

In one embodiment, viewer module 320 utilizes identification information associated with an entity to retrieve a model of the entity from a database of stock entity models. Thus for entity 205A, a vehicle, an appropriately sized model is retrieved. In one embodiment, viewer module 320 alters the appearance of the representation of an entity in a viewable rendering in response to occurrence of a trigger associated with the entity. For example, viewer module 320 causes the viewable representation of the entity to change in color or flash in response to occurrence of a trigger associated with the entity. It is appreciated that in some embodiments, viewer module 320 may comprise a modeling and simulation module which is separate from collision avoidance module 230.

Entity assigner 330 is configured for allowing assignment of an entity to a job site and modification of characteristics associated with the entity. Thus, in one embodiment, through functionality offered by entity assigner 330, a user is able to select which entity or entities are tracked for collision avoidance. Through entity assigner 330 a user may associate and/or disassociate a particular entity with the geographic location of a particular job site and physical and/or virtual entities of the particular job site. Entity assigner 330 additionally enables a user to subscribe to or unsubscribe from selected real time information served by real time server 220 regarding an entity.

Entity assigner 330 also allows a user to set and/or modify one or more conditions of a trigger associated with a tracked entity. This gives a user the flexibility to change, add, or remove a trigger based upon changing conditions, activities, or situations which may occur at a job site. For instance, a user may add or expand a virtual geo-fence or virtual exclusion zone around a protected wetland region in response rain being forecast to occur at a job site. Additionally, it is appreciated that entity assigner 330 allows a user to make such changes to a trigger from a central location without contacting or interacting with the entity on a collision avoidance device coupled with an entity. Entity assigner 330 also allows a user to assign, remove, or modify a virtual entity with respect to a job site.

Figure 5:
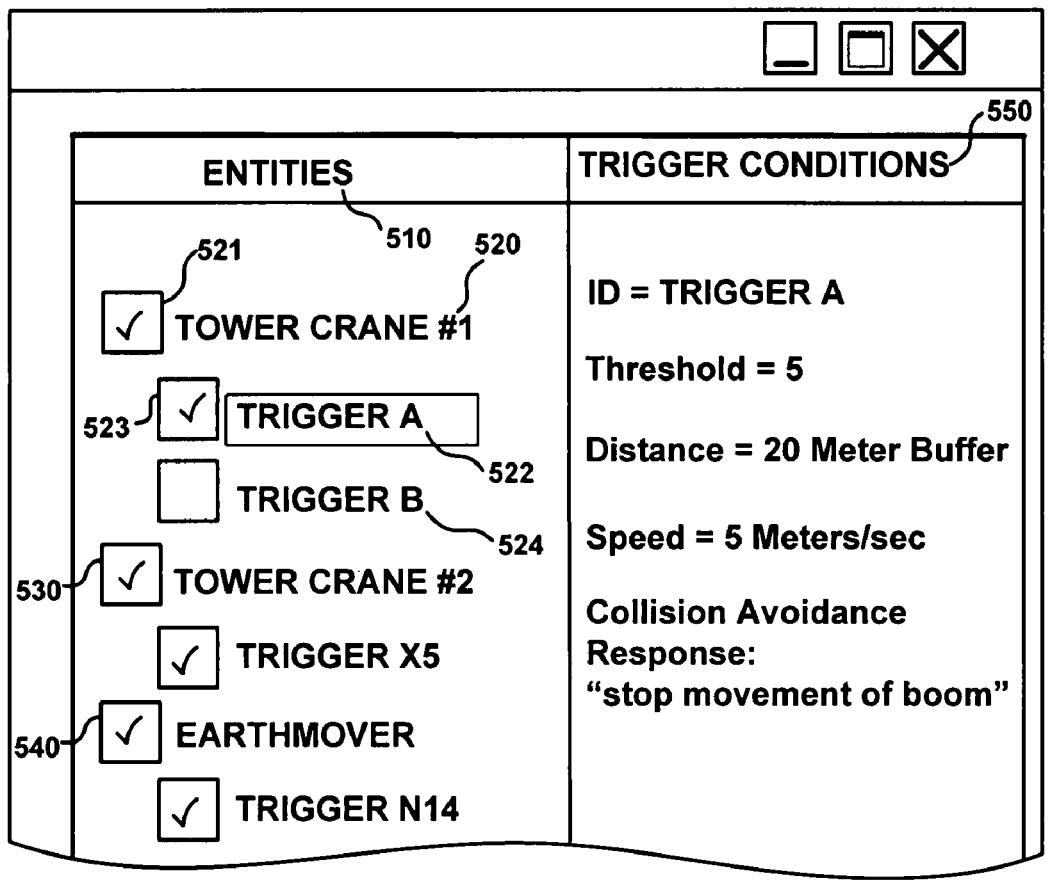
FIG. 5 is portion of an example graphical interface, in accordance with one embodiment.

FIG. 5 shows a portion of an example graphical interface 500 of entity assigner 330. As shown in graphical interface 500, names (e.g., 520, 530, and 540) associated with a plurality of entities are displayed. Each named entity may be assigned or unassigned for collision avoidance tracking by interacting with a selectable region (e.g., region 521). Accompanying each named entity is a listing of the trigger or triggers associated with that named entity. For example, triggers 522 and 524 are shown beneath named entity 520. Each trigger may be set or disabled by selecting a region displayed near the trigger (e.g., region 523). Likewise, by selecting a particular trigger, such as trigger 522, trigger conditions 550 for the trigger are displayed so that a user may view and or modify the trigger conditions for the selected trigger.

Referring again to FIG. 3, trigger tracker 340 is configured for evaluating the information received by collision avoidance module 230. The information is evaluated for occurrence of one or more of a plurality of triggers. To do this, trigger tracker 340 evaluates the received information for the occurrence of the combination of conditions of each trigger monitored by collision avoidance module 230.

Collision alert messenger 350 is configured for issuing a collision alert message and/or collision avoidance action for one or more entities in response to occurrence of one of a plurality of triggers. Thus, when collision alert messenger 350 receives notification of the occurrence of a trigger associated with an entity, collision alert messenger 350 issues a collision alert message for that entity. In some embodiments, the content of the collision alert message is dictated by a threshold value associated with the trigger or by a specific collision avoidance action specified as part of a trigger. A collision alert message comprises an electronic message containing identification information to direct its transmission to one or more entities and/or a collision avoidance device 600 coupled with an entity (or a plurality of collision avoidances devices 600 each coupled with a separate entity). The collision alert message may take many forms, such as streamed data, text message, cellular phone call, email, or other data carrying electronic formats. The collision alert message will also typically comprise a threshold value and or a specified collision avoidance action which should be taken by an entity.

For example in one embodiment each trigger includes a threshold value of between 1 and 10, with lower numbers indicating or associated with greater collision danger and closer proximity to an entity. Following this example, in one embodiment a collision alert messages also includes a threshold scaled from 1 to 10, with lower threshold values corresponding to more severe collision alert messages. In one embodiment, the threshold value of the trigger is simply incorporated as the threshold value of the collision alert message. In another embodiment a specific collision avoidance action, such as "engage hazard lights," "sound horn," "stop engine," "stop motor," or "apply brakes," is associated with a particular trigger or threshold value in a trigger, and this specific collision avoidance action is included in the collision alert message issued upon occurrence of the trigger.

Example Job Site Collision Avoidance Device

Figure 6:
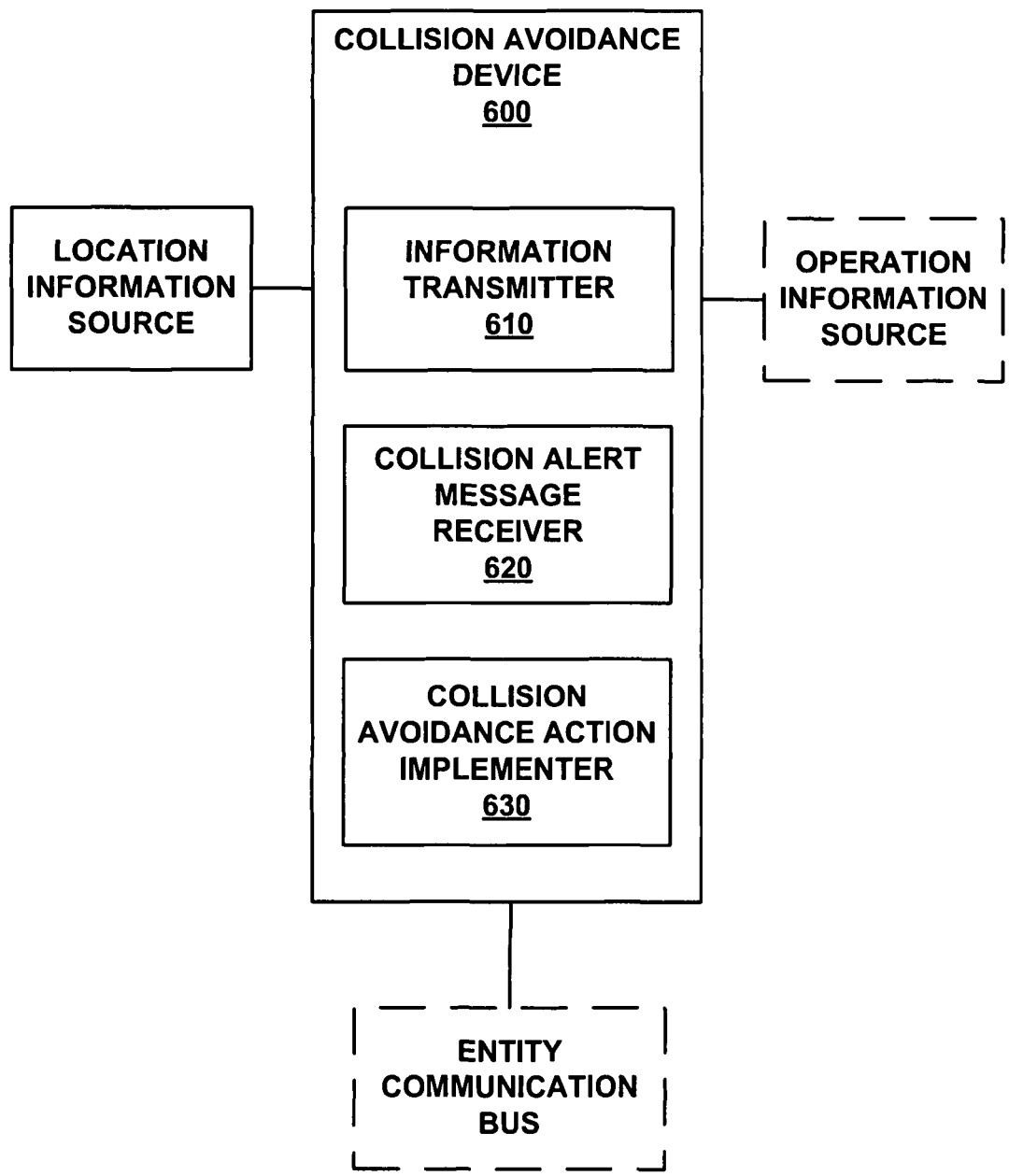
FIG. 6 is a block diagram of an example collision avoidance device, in accordance with one embodiment.

FIG. 6 is a block diagram of an example collision avoidance device 600, in accordance with one embodiment. In one embodiment, collision avoidance device 600 is coupled with a physical entity which operates, works, or is located on or proximate to a job site. In such an embodiment, collision avoidance device 600 operates as a job site collision avoidance device which interacts with collision avoidance system 200 (FIG. 2) to assist entities in the avoidance of collisions on a job site by increasing situational awareness and, in some instances, by intervening in the operation of a physical entity. In one embodiment, one or more of a plurality of physical entities on a job site is equipped with its own separate collision avoidance device 600.

As shown in FIG. 6, in one embodiment, job site collision avoidance device 600 is comprised of an information transmitter 610, a collision alert message receiver 620, and a collision avoidance action implementer 630.

Information transmitter 610 wirelessly transmits information regarding the location and/or operation of an entity to which it is coupled. The transmitted information includes location information and/or operation information regarding the entity to which device 600 is coupled. In one embodiment, this information is transmitted wirelessly to data transceiver 210 of collision avoidance system 200. Information transmitter 610 operates to wirelessly to transmit information in one or more well known fashions, such as via Bluetooth, via WiMax, via cellular telephone or radio, via one of the Institute of Electrical and Electronics Engineers 802.1 family of standards, or via other wireless data communication standard or protocol. In one embodiment, this information is transmitted on a periodic basis, such at an interval of 0.1 seconds, an interval of 5 seconds, or some other interval. In one embodiment, such information is transmitted at variable intervals, such as more frequently when the information is changing and less frequently when it remains static.

In one embodiment information transmitter 610 is coupled with a location information source which provides location information regarding the entity to which device 600 is coupled. In one embodiment, the location information source is included as a component or module of collision avoidance device 600. For example, in one embodiment, information transmitter 610 is coupled with a global navigation satellite system (GNSS) receiver with positioning capabilities based on signals from Galileo, GPS (Global Positioning System), Glonass, WAAS (Wide Area Augmentation Service), Egnos and the like. Such a location information source provides two-dimensional and/or three-dimensional location information regarding the entity to which device 600 is coupled. Such a location information source may also provide heading and or speed of an entity.

By way of example, and not of limitation, in one embodiment, entity 205B is a construction foreman's truck. An information transmitter 610 coupled with entity 205B may transmit location information indicating that entity 205B is located at latitude N37.19.11 latitude, W95.29.15 Longitude, and 11 meters ASL (above sea level). It is appreciated that such location information may be reported in a different manner, such as an offset from a particular reference point on a job site. It is also appreciated that such information may be reported with a greater or lesser degree of precision.

In one embodiment information transmitter 610 is coupled with an operation information source which provides operation information regarding the entity to which device 600 is coupled. For example, in one embodiment, information transmitter 610 is communicatively coupled with a J-bus, CAN (Controller Area Network) bus or other similar communications bus of a vehicle, crane, crane boom, or a construction equipment asset. Such operation information may include information which indicates whether the entity is operating and how fast the entity is moving, how much the entity weighs, and what mode the entity is currently in (e.g., lifting, hauling, grading, dumping, and etc.). For example, for entity 205A, information transmitter 610 may transmit operation information indicating that entity 205A is operating, is in reverse gear, is moving at a speed of 10 meters per second, and weighs 2000 Kilograms.

Collision alert message receiver 620 wirelessly receives a collision alert message. In one embodiment, the collision alert message is transmitted from collision avoidance system 200 for the entity with which device 600 is coupled. Collision alert message receiver 620 operates to wirelessly to receive information in one or more well known fashions, such as via Bluetooth, via WiMax, via cellular telephone or radio, via one of the Institute of Electrical and Electronics Engineers 802.1 family of standards, or via other wireless data communication standard or protocol. Collision alert message receiver 620 forwards a received collision alert message to collision avoidance action implementer 630.

Collision avoidance action implementer 630 implements a collision avoidance action in response to receiving a collision alert message. The purpose of implementing a collision avoidance action is to avoid a potential collision between a first entity on a job site and a second entity on a job site. Collision avoidance action implementer 630 is capable of implementing collision avoidance actions including: an operator notification, an audible warning, a visible warning, and an entity operation intervention (e.g., a machine control action to intervene in the operation of one or more entities for the purpose of avoiding a collision).

Example Method of Operation

The following discussion sets forth in detail the operation of some example systems, devices, and methods of operation of embodiments described herein. With reference to FIG. 7 and flow diagram 700, example steps used by various embodiments of the present technology are illustrated. Flow diagram 700 describes a process that, in various embodiments, is carried out by a processor under the control of computer-readable and computer-executable instructions. The computer-readable and computer-executable instructions reside, for example, in data storage features such as computer usable/readable volatile memory 104, computer usable/readable non-volatile memory 106, or computer useable/readable storage device 118 of computer system 100 (all shown in FIG. 1). The computer-readable and computer-executable instructions, which may reside on computer useable/readable media, are used to control or operate in conjunction with, for example, processor 102 of FIG. 1. Although specific steps are disclosed in flow diagram 700, such steps are examples. That is, embodiments are well suited to performing various other steps or variations of the steps recited. It is appreciated that the steps in flow diagram 700 may be performed in an order different than presented, and that not all of the steps in flow diagram 700 may be performed.

Avoiding a Collision on a Job Site

FIG. 7 illustrates a flow diagram 700 of an example method for avoiding a collision on a job site, in accordance with one embodiment. In the examples provide below, the operation of method of flow diagram is illustrated 700 utilizing the functionality of system 200 and device 600 to avoid a potential collision between an entity and a second entity on a job site.

At 710 of flow diagram 700, in one embodiment, the method receives information regarding a plurality of selected entities on a job site. The information is received at a location independent from the entities. For example, one embodiment utilizes data transceiver 210 to wirelessly receive information regarding a plurality of entities on a job site. Data transceiver 210 then forwards received information to real time server 220, which then in turn forwards the information to a subscribed module, such as collision avoidance module 230. This succinctly illustrates one example of a manner in which collision avoidance module 230 receives information regarding one or more of a plurality of assets on a job site.

In one embodiment, data transceiver 210 may receive information from a single entity (e.g., 205A), such as a vehicle. For example, data transceiver 210 receives such information from a collision avoidance device, such as collision avoidance device 600 (FIG. 6), which is coupled to the entity. In another embodiment, data transceiver 210 receives information from a plurality of entities (e.g., 205A, 205B, 205C, 205D, 205E, 205F, and etc.). For example, data transceiver 210 receives such information from a plurality of collision avoidance devices (such as collision avoidance device 600), each coupled to one of a plurality of entities which are on or proximate to a job site. In such an embodiment, each collision avoidance device 600 transmits information to data transceiver 210 regarding the entity to which is coupled.

The received information may comprise location information regarding an entity and/or operation information regarding an entity equipped with a collision avoidance device 600. In one example, when a crane boom or its crane is equipped with a collision avoidance device, the received information comprises the location of a crane boom in three dimensions, and/or the operation of the crane boom (e.g., loaded and swinging clockwise at 2 meters per second). In another example, this may comprise the location of a vehicle or construction equipment asset in two or three dimensions, along with operation information (e.g., vehicle running and moving Northwest at 20 meters per second). In yet another example, this information comprises a two-dimensional or three-dimensional location of a person carrying a collision avoidance device.

In some embodiments, the information is forwarded from data transceiver 210 to real time server 220 and then to collision avoidance module 230 in the same data format and/or context in which the information is received by data transceiver 210.

In other embodiments, collision avoidance module 230 receives the information in a triplet data format, where the triplet data format comprises an entity identification field, a value field, and a units field associated with the value field. For example, data transceiver 210 parses the received information and converts it into a uniform context called "triplet information," or otherwise known as "triplets," "triplet format," or "triplet data," and then forwards the triplet information. Triplet information is formatted with an entity identification field, a value field, and a units field associated with the value field (typically in that order). For example, data transceiver 210 parses and converts to triplet information, from a received communication regarding the two-dimensional location and operation of entity 205A, a vehicle. It is appreciated that the entity identification field may be identify an entity at a top level or else identify a more specific measure of a quantity or a quality associated with an entity. For example, the entity identification may identify a certain vehicle such as a particular bulldozer in a fleet of bulldozers (e.g., "bulldozer_75"). The entity identification may also be a more specific entity quantity identification or entity quality identification. An example of an entity quantity identification is the fuel level of a vehicle such as the particular bull dozer (e.g., "bulldozer_75_fuel"). An example of an entity quality identification is the directional heading of a vehicle such as the particular bull dozer (e.g., "bulldozer_75_heading").

Examples of resulting location information triplets for entity 205A are shown in Table 1. Some examples of operation information triplets pertaining to entity 205A are shown in Table 2. It is appreciated that such triplet information shown in Tables 1 and 2 may be parsed and converted from a variety of data formats such as steaming data, encrypted data, text files, email messages, and other data formats. Such triplets as shown in Tables 1 and 2 are then forwarded by data transceiver 210 to real time server 220. The unit portion of the triplet data may be optional if all the applications in the network assume a known unit system (e.g., Metric, English, etc). Thus, it is appreciated that in other embodiments, collision avoidance module 230 may receive information in other formats, such as a duet format comprised of an entity quantity identification/entity quality identification and the value (e.g., a duet).

TABLE 1

Examples of Location Information Converted to Triplet Information Format

| I.D. | Value | Units |
| --- | --- | --- |
| Vehicle1_n, | 37.19.10, | North Latitude |
| Vehicle1_e, | 95.29.15, | West Longitude |
| Vehicle1_h, | 110, | Directional Heading in Degrees |

TABLE 2

Examples of Operation Information Converted to Triplet Information Format

| I.D. | Value | Units |
| --- | --- | --- |
| Vehicle1_w, | 2000, | Kilograms |
| Vehicle1_spd, | 25, | Meters Per Second |

Converting received information into a triplets format is not required by the presented technology. However, converting received information into triplets format allows information received in a wide variety of formats to be standardized to a single format, thus eliminating repetitive parsing of the information at follow-on stages of processing which utilize the information. Additionally, converting and working with information in triplets format eliminates surplus data that is often received along with received information. It follows that by reducing the overall amount of data in this fashion, the rapidity of information communication/transmission may be increased and/or the bandwidth requirements for communication/transmission of information may be decreased; both of which are beneficial to the conduct of real time operations.

At 720 of flow diagram 700, in one embodiment, the method evaluates the information to determine whether a trigger has occurred. The trigger is associated with a potential collision situation involving an entity of the entities for which information has been received by collision avoidance module 230. In one embodiment, this comprises collision avoidance module 230 evaluating selected portions of the information it has received. For example, trigger tracker 340 evaluates received information for the occurrence of a trigger associated with a potential collision situation involving an entity (e.g., 205A) of the plurality of entities (e.g., 205A, 205B, 205C, 205D, 205E, 205F) which collision avoidance module 230 subscribes to and receives information regarding. To do this, trigger tracker 340 evaluates the information received in collision avoidance module 230 for the occurrence of the combination of conditions of each trigger monitored by collision avoidance module 230.

A trigger is a condition or set of conditions regarding the operation of an entity with respect to another entity, the occurrence of which triggers a collision alert message. A trigger is based upon situational factors obtainable from the selected information, such as speed of an entity, location on a job site, type of an entity, type of another entity near the entity (e.g., an a second entity that the first entity may be on a collision course with), and/or two-dimensional/three-dimensional location of an entity relative to another entity. In response to a set of conditions being met for occurrence of a trigger, collision avoidance module 230 issues a pre-selected collision alert message or action command to at least one entity. It is appreciated that such a trigger can be set or modified utilizing entity assigner 330.

The evaluation of information to determine whether a trigger has occurred can include, but is not limited to: evaluating a location of an entity on a job site to determine whether a trigger has occurred; comparing the location of an entity with a location of a second entity of plurality of selected (tracked) entities to determine whether a trigger has occurred; comparing the location of an entity to a location of a virtual entity to determine whether a trigger has occurred; evaluating operation information of an entity to determine whether a trigger has occurred.

In one embodiment, for example, entity 205A is a vehicle on a job site. During a day when blasting is being conducted on the job site, a trigger is set to occur for entity 205A if it enters a zone that is within 100 meters of the coordinates of a blasting area on the job site. Thus, in an instance where received information indicates that entity 205A is within 95 meters of the coordinates of the blasting area, trigger tracker 340 will evaluate the received information and determine that this trigger has occurred. Trigger tracker 340 then reports the occurrence of this trigger to collision alert messenger 350. This is an example of evaluating a location of an entity on a job site to determine whether a trigger has occurred.

In another embodiment, for example, entity 205C is the crane boom of a first tower crane at a job site and entity 205D is the crane boom of a second tower crane at the same job site. A trigger is set to occur for entity 205C whenever another entity of the job site enters a zone extending in a 10 meter three-dimensional volume surrounding entity 205C. Thus, in an instance where received information from either entity 205C or entity 205D indicates that entity 205C is within nine meters of entity 205D, trigger tracker 340 will evaluate the received information and determine that this trigger has occurred. Trigger tracker 340 then reports the occurrence of this trigger to collision alert messenger 350. This is an example of comparing the location of an entity with a location of a second entity of plurality of selected (tracked) entities to determine whether a trigger has occurred.

In yet another embodiment, for example, entity 205E is a construction equipment asset such as an earth mover. With reference to displayed viewable rendering 400 of FIG. 4, a saguaro cactus 401 is surrounded by a geo-fence 420. A trigger is set to occur for entity 205E if it is operating in reverse and enters a location within geo-fence 420. Thus, in an instance where received information indicates that entity 205E is within geo-fence 420, trigger tracker 340 will evaluate the received information and determine that this trigger has occurred. Trigger tracker 340 then reports the occurrence of this trigger to collision alert messenger 350. This is an example of comparing the location of the entity to a location of a virtual entity to determine whether a trigger has occurred. This is also an example of evaluating operation information of an entity to determine whether a trigger has occurred.

At 730 of flow diagram 700, in one embodiment, the method issues a collision alert message for the entity if the trigger has occurred. In one embodiment, collision alert messenger 350 issues a collision alert message in response to being notified by trigger tracker 340 of the occurrence of a trigger. In some embodiments, the type and content of the collision alert message are dictated by a threshold associated with the trigger or a specific collision avoidance action specified as part of a trigger. In one embodiment, the issued collision message is routed via real time server 220 to data transceiver 210, which then wirelessly transmits the collision alert message for an entity. In one embodiment, this comprises transmitting the collision alert message to a collision avoidance device 600 coupled with an entity. As previously described, information transceiver 210 may be on or proximal to a job site, or located a great distance from a job site. Additionally, as previously described, information transceiver 210 is typically located independent of the location of an entity from which it receives information/to which it transmits information. Thus, in one embodiment, the collision alert message is wirelessly transmitted from a location independent of the entity or entities to which the message is being transmitted.

Following the previous example involving vehicle 205A, collision alert messenger 350 receives notification of the occurrence of a trigger associated with entity 205A. In response, collision alert messenger 350 issues a collision alert message (collision alert message A) for entity 205A.

Following the previous example involving crane booms 205C and 205D, collision alert messenger 350 receives notification of the occurrence of a trigger associated with entity 205C. In response, collision alert messenger 350 issues a collision alert message (collision alert message B) for entity 205C.

Following the previous example involving earth mover 205E, collision alert messenger 350 receives notification of the occurrence of a trigger associated with entity 205E. In response, collision alert messenger 350 issues a collision alert message (collision alert message C) for entity 205E.

In one embodiment, the method of flow diagram 700 further comprises setting a condition for occurrence of a trigger. As previously discussed, the conditions for occurrence of a trigger can be set or modified utilizing entity assigner 330. In some instances, the some triggers and conditions thereof are automatically set based upon pre-defined safe operating conditions and rule for a particular type of entity. For example, a an automatic trigger may exist such that a collision alert message is generated anytime earth mover 205E is operated in reverse within 5 meters of person, such as person 205F, who is being tracked by collision avoidance module 230. In one embodiment, in response to muddy conditions on a job site, a user may add a second trigger to occur when earthmover 205E is operated in reverse within 10 meters of person 205F.

In one embodiment the method of flow diagram 700 further comprises, continuing the receiving and evaluating, which was described in conjunction with flow diagram steps 710 and 720, to determine whether an additional trigger has occurred, and issuing an additional collision alert message if the additional trigger has occurred. The additional trigger being an additional potential collision situation involving the entity.

Referring to the example illustrated above by earthmover 205E, in one embodiment, when earthmover 205E is operated in reverse within 10 meters of person 205F, a condition for a first trigger will have occurred. In response to evaluating received information, trigger tracker 340 notifies collision alert messenger regarding the occurrence of the first trigger. Collision alert messenger 350 sends out an appropriate collision alert message (collision alert message D) in response to the occurrence of this first trigger. If earthmover 205E is then operated until it is within 5 meters of person 205F, a second condition will have been met for a second trigger to occur. In response to continuing to evaluate received information, trigger tracker 340 notifies collision alert messenger regarding the occurrence of the second trigger. Collision alert messenger 350 sends out an appropriate collision alert message (collision alert message E) in response to the occurrence of this second trigger.

In one embodiment the method of flow diagram 700 further comprises, receiving a collision alert message at an entity, and in response to the collision alert message, automatically implementing a collision avoidance action at the entity. The collision alert avoidance action is meant to assist in avoiding a collision between a first entity and a second entity on a job site.

It is appreciated that the first entity may be a person, a vehicle, a crane, a crane boom, a construction equipment asset, or another static or mobile physical entity on or proximate to a job site. The second entity to be avoided may likewise be a person, a vehicle, a crane, a crane boom, a construction equipment asset, or another static or mobile physical entity on or proximate to a job site. Additionally either the first entity or the second entity to be avoided may comprise a virtual entity such as a geo-fence or other virtual boundary established on or proximate to a job site.

In one embodiment, the collision alert message is transmitted from collision avoidance system 200 for the entity with which a collision avoidance device 600 is coupled. In such an embodiment, collision alert message receiver 620 is used to wirelessly receive the collision alert message. Collision alert message receiver 620 then forwards this message to collision avoidance action implementer 630.

Collision avoidance action implementer 630 implements a collision avoidance action at an entity in response to receiving a collision alert message for the entity. Collision avoidance action implementer 630 is capable of implementing collision avoidance actions including: an operator notification, an audible warning, a visible warning, and an entity operation intervention (e.g., a machine control action to intervene in the operation of one or more entities for the purpose of avoiding a collision).

In some embodiments, the nature of the collision avoidance action implemented is specified by the collision alert message. In other embodiments, the nature of the collision avoidance action depends upon the threshold value included in the collision alert message and the range of collision avoidance actions available with respect to a particular entity with which collision avoidance action implementer 630 is coupled. Thus, in an embodiment where a wide range of collision avoidance actions are available, differing collision avoidance actions (or combinations of collision avoidance actions) may be associated with different threshold values. Conversely, where only one collision avoidance action is available, that single collision avoidance action may be associated with a wide range or all threshold values.

In one embodiment, in response to receiving a collision alert message, collision avoidance action implementer 630 implements a collision avoidance action which provides an operator notification. An example of such an operator notification is a text message on a display (e.g., on a computer display, a cellular telephone display, or a display coupled to device 600). Another example of an operator notification is a vibration (e.g., a vibrating cellular phone, collision avoidance device 600, steering mechanism, or seat). In one embodiment, an operator notification in the form of a message stating, "Collision Imminent!" is displayed on a display of an entity, in response to receiving collision alert message A. In one embodiment, an operator notification in the form of a vibrating driver's seat is taken in response to receiving collision alert message D.

In one embodiment, in response to receiving a collision alert message, collision avoidance action implementer 630 implements a collision avoidance action which provides an audible warning. Some examples of an audible warning include a specific ring on a cellular telephone; a honking of a horn attached to an entity; and an audible announcement or warning tone enunciated from a speaker coupled to an entity or to a collision avoidance device 600. In one embodiment, an audible warning in the form of honking a horn is taken in response to receiving collision alert message C.

In one embodiment, in response to receiving a collision alert message, collision avoidance action implementer 630 implements a collision avoidance action which provides a visible warning. Some examples of a visible warning include: flashing the dash lights or other interior lights; engaging hazard lights, flashing or otherwise engaging headlamps or other external illumination devices an entity; illuminating a warning indicator on or within an entity; illuminating a yellow or red indicator of a "virtual stoplight" (e.g., a panel comprised of red, yellow, and green indicator lights and mounted on or within a vehicle), and illuminating a warning indicator coupled to a collision avoidance device 600. In one embodiment, a visible warning in the form of illuminating a warning light is taken in response to receiving collision alert message E.

In one embodiment, in response to receiving a collision alert message, collision avoidance action implementer 630 implements a collision avoidance action which intervenes into the operation of the first entity for the purpose of averting a collision with the second entity. In one embodiment, for example, collision avoidance action implementer 630 is coupled with a J-bus, CAN-bus or other communication bus linked to a motor, engine, steerage, and/or braking system of a vehicle, crane, crane boom, or a construction equipment asset. Via such a coupling to a communication bus or via other mechanical, electrical, or electro-mechanical coupling to such systems, collision avoidance action implementer 630 implements a collision avoidance action, such as: limiting or halting revolutions of a motor or engine, limiting upper speed of an vehicle or construction equipment asset, applying a brake, halting or slowing radial swing of a crane boom, and/or adjusting a direction of travel of an entity or a portion of an entity. In one embodiment, an entity operation intervention action in the form of a stopping the movement of crane boom 205C is taken in response to receiving collision alert message B.

Some other examples of intervening in the operation of an entity, include governing the top speed of a vehicle or construction equipment asset when inside a region protected by a geo-fence; applying brakes in vehicle or construction equipment asset to avoid a collision with a person or another vehicle or construction equipment asset; stopping or slowing second vehicle or construction equipment asset to avoid a collision with a first vehicle or construction equipment asset, stopping or slowing multiple vehicles or construction equipment assets to avoid a collision between two or more of the multiple vehicles or construction equipment assets; and stopping or slowing the movement/rotation of a crane boom to avoid a collision with another crane boom, building, vehicle, virtual protected region, or construction equipment asset.

Embodiments of the present technology are thus described. While the present technology has been described in particular embodiments, it should be appreciated that the present technology should not be construed as limited by such embodiments, but rather construed according to the following claims.

We claim:

1. A method for avoiding a collision on a job site, said method comprising:
   receiving information regarding a plurality of selected entities on a job site, said information received at a location independent from said entities;
   evaluating said information to determine whether a trigger has occurred, said trigger associated with a potential collision situation involving an entity of said entities, wherein said received information includes operation information received regarding said entity; and
   issuing a collision alert message for said entity if said trigger has occurred.

2. The method as recited in claim 1, further comprising:
   setting a condition for occurrence of said trigger.

3. The method as recited in claim 1, further comprising:
   continuing said receiving and evaluating to determine whether an additional trigger has occurred, said additional trigger associated with an additional potential collision situation involving said entity; and
   issuing an additional collision alert message if said additional trigger has occurred.

4. The method as recited in claim 1, further comprising:
   receiving said collision alert message at said entity; and
   in response to said collision alert message, automatically implementing a collision avoidance action at said entity.

5. The method as recited in claim 4, wherein said automatically implementing a collision avoidance action at said entity comprises:
   implementing an action from the list of actions consisting of: an operator notification, a visible warning, an audible warning, an intervention into the operation of said entity, and an intervention into the operation of another entity.

6. The method as recited in claim 1, wherein said receiving information regarding a plurality of selected entities on a job site comprises:
   receiving said information in a triplet data format, said triplet data format comprising an entity identification field, a value field, and a units field associated with said value field.

7. The method as recited in claim 1, wherein said receiving information regarding a plurality of selected entities on a job site comprises:
   receiving location information regarding said entity.

8. The method as recited in claim 1, wherein said evaluating said information to determine whether a trigger has occurred comprises:
   evaluating a location of said entity on said job site to determine whether said trigger has occurred.

9. The method as recited in claim 8, wherein said evaluating a location of said entity on said job site to determine whether said trigger has occurred comprises:
   comparing said location of said entity with a location of a second entity of said plurality of selected entities to determine whether said trigger has occurred.

10. The method as recited in claim 8, wherein said evaluating a location of said entity on said job site to determine whether said trigger has occurred comprises:
    comparing said location of said entity to a location of a virtual entity to determine whether said trigger has occurred.

11. The method as recited in claim 8, further comprising:
    evaluating said operation information of said entity to determine whether said trigger has occurred.

12. The method as recited in claim 8, further comprising:
    evaluating operation information of a second entity to determine whether said trigger has occurred.

13. The method as recited in claim 1, wherein said issuing a collision alert message for said entity if said trigger has occurred comprises:
    wirelessly transmitting said collision alert message from said location independent of said entities.

14. A tangible computer-readable storage medium having computer-executable instructions stored thereon, which, when executed, cause a computing system to perform a method for avoiding a collision on a job site, said method comprising:
    receiving information regarding a plurality of selected entities on a job site, said information received at a location independent from said entities;
    evaluating said information to determine whether a trigger has occurred, said trigger associated with a potential collision situation involving an entity of said entities, wherein said evaluating includes comparing a location of said entity to a location of a virtual entity to determine whether said trigger has occurred; and
    issuing a collision alert message for said entity if said trigger has occurred.

15. The tangible computer-readable storage medium of claim 14, wherein said method further comprises:
    setting a condition for occurrence of said trigger.

16. The tangible computer readable storage medium of claim 14, wherein said method further comprises:
    continuing said receiving and evaluating to determine whether an additional trigger has occurred, said additional trigger associated with an additional potential collision situation involving said entity; and
    issuing an additional collision alert message if said additional trigger has occurred.

17. The tangible computer readable storage medium of claim 14, wherein said receiving information regarding a plurality of selected entities on a job site comprises:
    receiving said information in a triplet data format, said triplet data format comprising an entity identification field, a value field, and a units field associated with said value field.

18. The tangible computer readable storage medium of claim 14, wherein said receiving information regarding a plurality of selected entities on a job site comprises:
    receiving location information regarding said entity.

19. The tangible computer readable storage medium of claim 14, wherein said receiving information regarding a plurality of selected entities on a job site comprises:
    receiving operation information regarding said entity.

20. The tangible computer readable storage medium of claim 14, wherein said evaluating said information to determine whether a trigger has occurred comprises:
    evaluating a location of said entity on said job site to determine whether said trigger has occurred.

21. The tangible computer readable storage medium of claim 20, wherein said evaluating a location of said entity on said job site to determine whether said trigger has occurred comprises:
    comparing said location of said entity with a location of a second entity of said plurality of selected entities to determine whether said trigger has occurred.

22. The tangible computer readable storage medium of claim 20, further comprising:
    evaluating operation information of said entity to determine whether said trigger has occurred.

23. The tangible computer readable storage medium of claim 20, further comprising:
    evaluating operation information of a second entity to determine whether said trigger has occurred.

24. A collision avoidance system, said system comprising:
    a data transceiver configured for receiving information regarding a plurality of entities on a job site;
    a real time server coupled with said data transceiver, said real time server configured for providing said information in real time to a subscribed module; and
    a collision avoidance module coupled with said real time server and subscribed to receive selected portions of said information, said collision avoidance module configured for evaluating said information for occurrence of a trigger associated with a potential collision situation involving an entity of said entities, said collision avoidance module further configured for issuing a collision alert message to at least one entity upon the occurrence of said trigger.

25. The system of claim 24, wherein said data transceiver is further configured to wirelessly transmit said collision alert message to said at least one entity.

26. The system of claim 24, wherein said collision avoidance module is located independently from said plurality of entities.

27. The system of claim 24, wherein said collision avoidance module comprises:
    a user interface configured for facilitating user interaction with and modification of settings of said collision avoidance module.

28. The system of claim 27, wherein said user interface comprises:
    a viewer module configured for outputting a viewable rendering of said entities with respect to said job site.

29. The system of claim 27, wherein said user interface comprises:
an entity assigner configured for allowing assignment of an entity to said job site and modification of characteristics associated with said entity.

30. The collision avoidance system of claim 24, wherein said collision avoidance module comprises:
a trigger tracker configured for evaluating said information for occurrence of a plurality of triggers.

31. The collision avoidance system of claim 24, wherein said collision avoidance module comprises:
a collision alert messenger configured for issuing a collision alert message in response to occurrence of one of a plurality of triggers.

32. A job site collision avoidance device, said device comprising:
a means for wirelessly transmitting information regarding an entity with which said device is coupled, said information transmitted to a collision avoidance system located independent from said entity;
a location information source coupled with said means for wirelessly transmitting information, said location information source for providing location information regarding said entity;
a means for wirelessly receiving an collision alert message transmitted to said entity from said collision avoidance system; and
a means for implementing a collision avoidance action to avoid a collision involving said entity and a second entity of said job site, said collision avoidance action initiated in response to receiving said collision alert message.

33. The device of claim 32, wherein said information comprises said location information.

34. The device of claim 32, wherein said information comprises operation information.

35. The device of claim 32, wherein said entity comprises a person.

36. The device of claim 32, wherein said entity comprises a vehicle.

37. The device of claim 32, wherein said entity comprises a crane boom.

38. The device of claim 32, wherein said entity comprises a construction equipment asset.

39. The device of claim 32, wherein said second entity comprises a physical entity.

40. The device of claim 32, wherein said second entity comprises a virtual entity.

41. The device of claim 32, wherein said a means for implementing a collision avoidance action to avoid a collision involving said entity and a second entity of said job site comprises:
a means for notifying an operator.

42. The device of claim 32, wherein said a means for implementing a collision avoidance action to avoid a collision involving said entity and a second entity of said job site comprises:
a means for providing an audible warning.

43. The device of claim 32, wherein said a means for implementing a collision avoidance action to avoid a collision involving said entity and a second entity of said job site comprises:
a means for providing a visible warning.

44. The device of claim 32, wherein said a means for implementing a collision avoidance action to avoid a collision involving said entity and a second entity of said job site comprises:
a means for intervening into the operation of said entity for the purpose of avoiding said collision.

45. A job site collision avoidance device, said device comprising:
a means for wirelessly transmitting information regarding an entity with which said device is coupled, said information transmitted to a collision avoidance system located independent from said entity;
a means for wirelessly receiving an collision alert message transmitted to said entity from said collision avoidance system; and
a means for implementing a collision avoidance action to avoid a collision involving said entity and a second entity of said job site, said collision avoidance action initiated in response to receiving said collision alert message, wherein said second entity is a virtual entity.

46. The device of claim 45, further comprising a location information source coupled with said means for wirelessly transmitting information, said location information source for providing location information regarding said entity.

47. The device of claim 45, wherein said information comprises location information.

48. The device of claim 45, wherein said information comprises operation information.

49. The device of claim 45, wherein said entity comprises a person.

50. The device of claim 45, wherein said entity comprises a vehicle.

51. The device of claim 45, wherein said entity comprises a crane boom.

52. The device of claim 45, wherein said entity comprises a construction equipment asset.

53. The device of claim 45, wherein said entity comprises a physical entity.

54. The device of claim 45, wherein said entity comprises a virtual entity.

55. The device of claim 45, wherein said means for implementing a collision avoidance action to avoid a collision involving said entity and a second entity of said job site comprises a means selected from the group of means for avoiding a collision action consisting of:
a means for notifying an operator, a means for providing an audible warning, a means for providing a visible warning, and a means for intervening into the operation of said entity for the purpose of avoiding said collision.

56. A method for avoiding a collision on a job site, said method comprising:
receiving information regarding a plurality of selected entities on a job site, said information received at a location independent from said entities;
evaluating said information to determine whether a trigger has occurred, said trigger associated with a potential collision situation involving an entity of said entities, wherein said evaluating includes comparing a location of said entity to a location of a virtual entity to determine whether said trigger has occurred; and
issuing a collision alert message for said entity if said trigger has occurred.

57. The method as recited in claim 56, further comprising:
setting a condition for occurrence of said trigger.

58. The method as recited in claim 56, further comprising:
continuing said receiving and evaluating to determine whether an additional trigger has occurred, said additional trigger associated with an additional potential collision situation involving said entity; and
issuing an additional collision alert message if said additional trigger has occurred.

59. The method as recited in claim 56, further comprising:
receiving said collision alert message at said entity; and
in response to said collision alert message, automatically implementing a collision avoidance action at said entity.

60. The method as recited in claim 59, wherein said automatically implementing a collision avoidance action at said entity comprises:
implementing an action from the list of actions consisting of: an operator notification, a visible warning, an audible warning, an intervention into the operation of said entity, and an intervention into the operation of another entity.

61. The method as recited in claim 56, wherein said receiving information regarding a plurality of selected entities on a job site comprises:
receiving said information in a triplet data format, said triplet data format comprising an entity identification field, a value field, and a units field associated with said value field.

62. The method as recited in claim 56, wherein said receiving information regarding a plurality of selected entities on a job site comprises:
receiving location information regarding said entity.

63. The method as recited in claim 56, wherein said receiving information regarding a plurality of selected entities on a job site comprises:
receiving operation information regarding said entity.

64. The method as recited in claim 56, wherein said evaluating said information to determine whether a trigger has occurred comprises:
evaluating a location of said entity on said job site to determine whether said trigger has occurred.

65. The method as recited in claim 64, wherein said evaluating a location of said entity on said job site to determine whether said trigger has occurred comprises:
comparing said location of said entity with a location of a second entity of said plurality of selected entities to determine whether said trigger has occurred.

66. The method as recited in claim 64, further comprising:
evaluating operation information of said entity to determine whether said trigger has occurred.

67. The method as recited in claim 64, further comprising:
evaluating operation information of a second entity to determine whether said trigger has occurred.

68. The method as recited in claim 56, wherein said issuing a collision alert message for said entity if said trigger has occurred comprises:
wirelessly transmitting said collision alert message from said location independent of said entities.

* * * * *